United States Patent [19]

Fresard

[11] 4,169,353

[45] Oct. 2, 1979

[54] PNEUMATIC CONTROL DEVICE

[75] Inventor: Marcel Fresard, Petit-Lancy, Switzerland

[73] Assignee: Mefina S.A., Fribourg, Switzerland

[21] Appl. No.: 862,980

[22] Filed: Dec. 21, 1977

[30] Foreign Application Priority Data

Dec. 30, 1976 [CH] Switzerland ........................ 16463/76

[51] Int. Cl.[2] ............................ F15B 7/08; F16J 3/02

[52] U.S. Cl. ........................................ 60/592; 60/533; 92/91; 92/98 R

[58] Field of Search ...................... 60/533, 592; 92/92, 92/98 R, 91, 98; 200/83 Z, 86.5, 81 H; 242/86

[56] References Cited

U.S. PATENT DOCUMENTS

| | | | |
|---|---|---|---|
| 2,495,092 | 1/1950 | Cox et al. | 92/92 |
| 2,615,755 | 10/1952 | Crawford | 242/86 |
| 2,834,296 | 5/1958 | Neufeld et al. | 92/92 |
| 3,234,739 | 2/1966 | Pierce, Jr. | 200/83 Z |

FOREIGN PATENT DOCUMENTS

| | | | |
|---|---|---|---|
| 67292 | 6/1974 | Australia | 60/533 |

*Primary Examiner*—Irwin C. Cohen

*Attorney, Agent, or Firm*—Emory L. Groff, Jr.

[57] ABSTRACT

A pneumatic control device for a displaceable member of an electric circuit, having a compressible air reservoir adapted and connected by a flexible conduit to an enclosure comprising the said movable member, and comprising three superposed rigid or semi-rigid members which are at least partially housed or enclosed one inside the other, and at least one member having a compressible wall and having an edge which is engaged and clamped between two of the superposed rigid or semi-rigid members; the first of said members together with the compressible walled member delimiting the air reservoir and being provided with a nozzle leading into an inner chamber which is delimited by the assembly of said three rigid or semi-rigid members; the second and third of said members delimiting a passage between them which connects the inner chamber to an annular outer chamber delimited by the second and the third rigid or semi-rigid members and open at its periphery; said flexible conduit being connected to the nozzle in the inner chamber and guided by the above mentioned passage towards the outer chamber into which it may be wrapped for storage therein.

6 Claims, 4 Drawing Figures

FIG. 2
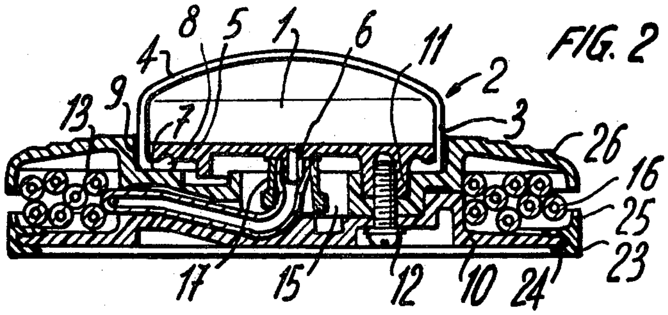
FIG. 3
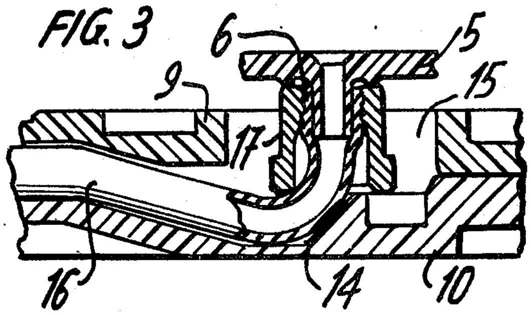
FIG. 4
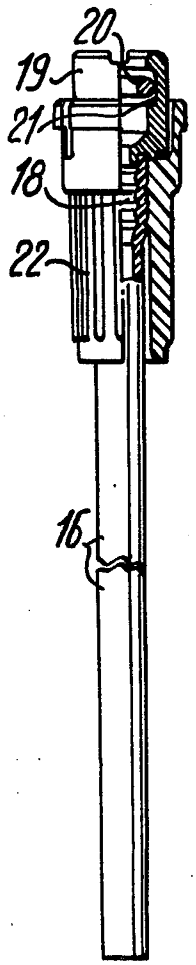
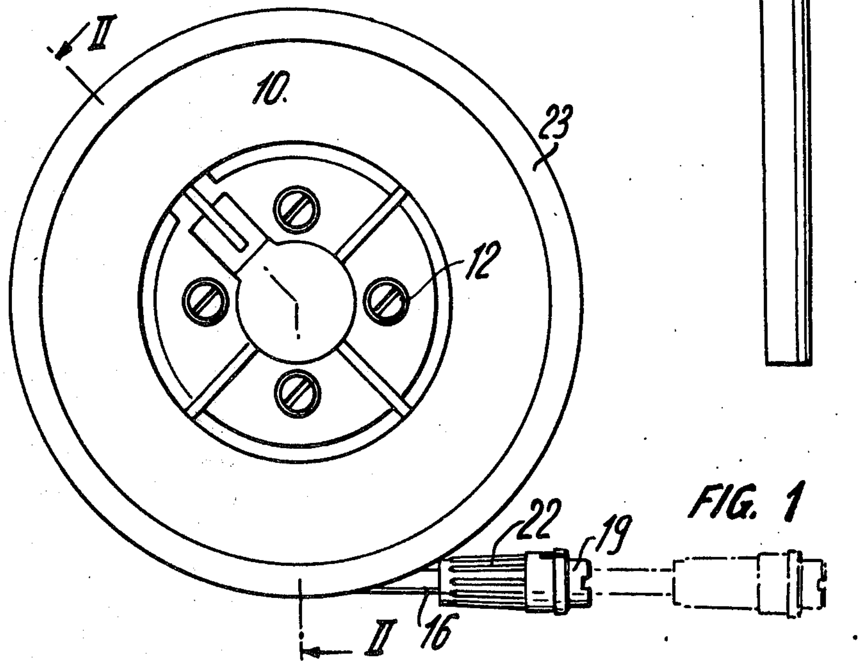
FIG. 1

PNEUMATIC CONTROL DEVICE

The present invention relates to a pneumatic control device for a movable member of an electric circuit, comprising a compressible air reservoir adapted to be connected by a flexible conduit to an enclosure including the said movable member.

According to the present invention there is provided a pneumatic control device for a displaceable member of an electric circuit, having a compressible air reservoir adapted and connected by flexible conduit to an enclosure comprising the said movable member and comprising three superposed rigid or semi-rigid members which are at least partially housed or enclosed one inside the other, and at least one member having a compressible wall and having an edge which is engaged and clamped between two of the superposed rigid or semi-rigid members; the first of said members together with the compressible walled member delimiting the air reservoir and being provided with a nozzle leading into an inner chamber which is delimited by the assembly of said three rigid or semi-rigid members; the second and third of said members delimiting a passage between them which connects the inner chamber to an annular outer chamber delimited by the second and the third rigid or semi-rigid members and open at its periphery; said flexible conduit being connected to the nozzle in the inner chamber and guided by the above mentioned passage towards the outer chamber into which it may be wrapped for storage therein.

The invention will be described further, by way of example, with reference to the accompanying drawings, in which:

FIG. 1 is an inverted plan view;

FIG. 2 is a sectional view taken on the line II—II of FIG. 1;

FIG. 3 is an enlarged fragmentary view of FIG. 2; and

FIG. 4 is a detail partially in section and on an enlarged scale, representing the free end of a flexible conduit.

A pneumatic control device is illustrated in the drawings and comprises an air reservoir 1 delimited by a membrane 2 of flexible and elastic material having a cylindrical portion 3 closed at its upper end by a curved dome portion 4 and open at its lower end, and by a disc 5 of rigid or semi-rigid material and having a central downwardly directed nozzle 6.

The lower end of the cylindrical portion 3 has an inwardly directed flange 7 terminating in a boss 8. The flange 7 of the membrane 2 is clamped between the edge of the disc 5 and an intermediate part 9 housed in base 10; said disc 5 being housed in the intermediate part 9. The disc 5 has an edge which bears on the flange 7 of membrane 2 and has four tapped bosses 11 located opposite and aligned with coaxial holes provided in the intermediate part 9 and base 10. Screws 12 are engaged by their threaded portions in the taps of the bosses 11 and extend through the holes in the base 10 and of the intermediate part 9 and thus secure the flange 7 of the membrane 2 between the disc 5 and the intermediate part 9 while also connecting them to the base 10 in which part 9 is housed.

An annular outer chamber 13 is defined between the base 10 and intermediate part 9 and is open at its outer periphery. A radial conduit 14 connects the chamber 13 to an inner chamber 15 into which the nozzle 6 leads and discharges. The inner chamber 15 is delimited by the disc 5, the intermediate part 9 and the base 10. A flexible pipe 16 is mounted at one end on the nozzle 6 and secured thereto by a tapped sleeve or cylinder 17. The flexible pipe 16 extends from the nozzle 6 via the radial conduit 14 in the direction of the external annular chamber 13 and is wound in chamber 13 when the pneumatic control device is not being used.

As shown in FIGS. 2 and 3, the tapped cylinder 17 is screwed on the end of the pipe 16 which is mounted on the nozzle 6 and is secured by the screw 12 between the disc 5 and the base 10 on assembly of the device. The end of the pipe 16 mounted on the nozzle 6 is thus perfectly immobilized thereon.

The free end of the pipe 16 is engaged on a channeled extension 18 of a female grip 19 presenting an internal annular coupling means or joint 20 housed in an internal circular groove 21 of the grip 19. The free end of the pipe 16 is secured on the channeled extension 18 of the female grip 19 by a tap sleeve 22.

An annular part 23 of flexible and elastic material has a groove 24 at its inner periphery and is mounted on the external periphery of the base 10 of the device. This annular part 23 also has a peripheral rib 25 extending at right angles with respect to the groove 24 and towards the peripheral edge of the intermediate part 9. This rib 25 reduces the height of the peripheral opening of the external annular chamber 13 to an amount less than the diameter of the pipe 16. Due to its flexibility the rib 25 nevertheless permits the pipe 16 to be wound in the annular chamber 13 while the rib 25 acts to prevent undesired escape therefrom.

The edge of the annular part 23 covering the edge of the internal face of the base 10 in use of the control device causes such to be raised with respect to the supporting surface and prevents it from sliding on a slippery surface.

As shown in FIG. 2, the upper face 26 of the edge of the intermediate part 9 adjacent the membrane 2 conforms in a manner to serve for the bearing thereon of the foot of the user whilst he operates the pneumatic control device.

Numerous variations of the device described and shown in the drawings can be envisaged. The dome 4 of the membrane 2 could, for example, be partially replaced by a rigid part set in the membrane 2 and which is more resistant to wear. The assembly of the membrane could, moreover, equally well be replaced by a metal dome sliding on or in a metallic cylinder, the inner end of which would present an internal flange secured between two of the superposed rigid or semi-rigid members 5 and 9.

Of course, the membrane 2 and the superposed members 5,9 and 10 could be of different form and delimiting enclosures having for example, vertical non-circular walls.

The pneumatic control device described is particularly suitable for operating the rheostat of the electric regulator of a sewing machine such as is described in Swiss Patent No. 606,579 dated Nov. 15, 1978.

I claim:

1. A pneumatic control device for a movable member of an electric circuit including a compressible air reservoir, a flexible conduit connecting said reservoir to an enclosure comprising the said movable member, said device comprising three superposed members which are at least partially housed one inside the other, fastener means connecting said members to one another and at least one member having a compressible wall and having an edge which is engaged and clamped between two of said superposed members; the first of said members together with said compressible walled member delimiting the air reservoir and being provided with an outlet nozzle discharging into an inner chamber which is delimited by the assembly of said three superposed members; the second and third of said superposed members delimiting a passage between them which connects said inner chamber to an annular outer storage chamber delimited by said second and third superposed members, said outer chamber being open at its periphery; said second and third superposed members each having a peripheral edge, said flexible conduit being connected to said nozzle in said inner chamber and guided by said passage towards said outer storage chamber within which it is wrapped prior to withdrawl therefrom.

2. A device according to claim 1, wherein said compressible walled member is a membrane.

3. A device according to claim 1, wherein an annulus of elastomeric material is provided presenting a peripheral inwardly directed groove and is mounted on the peripheral edge of said third member; such annulus being provided with a rib extending at right angles with respect to its internal peripheral groove and extending towards said peripheral edge of said second member.

4. A device according to claim 1, wherein the free end of said flexible conduit is engaged on a channeled extension of a female grip presenting an internal annular joint in elastomeric material and secured on the said extension by a tapped sleeve.

5. A device according to claim 1 wherein the end of said flexible conduit mounted on said nozzle discharging into said inner chamber is secured on said nozzle by a tapped cylindrical part which is clamped between said superposed members constituting the upper and lower walls of said inner chamber.

6. A device according to claim 1 in which the external face of the upper wall of said annular outer storage chamber surrounds said compressible walled member of the air reservoir in a manner to serve as a bearing for the foot of an operator when compressing said air reservoir.

* * * * *